(12) United States Patent
Hagiwara et al.

(10) Patent No.: US 9,348,547 B2
(45) Date of Patent: May 24, 2016

(54) DOCUMENT DISTRIBUTION SERVER AND DOCUMENT DISTRIBUTION METHOD

(71) Applicants: KABUSHIKI KAISHA TOSHIBA, Tokyo (JP); TOSHIBA TEC KABUSHIKI KAISHA, Tokyo (JP)

(72) Inventors: Takahiro Hagiwara, Chiba Chiba (JP); Kazuhiro Ogura, Hiratsuka Kanagawa (JP); Kazunori Hirabayashi, Yokohama Kanagawa (JP); Akihiro Mizutani, Mishima Shizuoka (JP); Toshihiro Ida, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/479,156

(22) Filed: Sep. 5, 2014

(65) Prior Publication Data

US 2016/0070520 A1    Mar. 10, 2016

(51) Int. Cl.
*H04N 1/40* (2006.01)
*G06F 3/12* (2006.01)

(52) U.S. Cl.
CPC ............ *G06F 3/1285* (2013.01); *G06F 3/1208* (2013.01); *G06F 3/1256* (2013.01)

(58) Field of Classification Search
USPC ........................ 358/1.15, 468, 400, 434, 1.16
See application file for complete search history.

(56) References Cited

U.S. PATENT DOCUMENTS

| 7,953,078 | B2* | 5/2011 | Sakai | .................. H04L 29/1232 358/1.15 |
| 2010/0149091 | A1* | 6/2010 | Kota et al. | ............... G06T 11/00 345/156 |
| 2012/0044533 | A1* | 2/2012 | Inoue | .................... H04N 1/0022 358/1.15 |
| 2013/0185356 | A1 | 7/2013 | Mizutani et al. | |
| 2013/0188219 | A1 | 7/2013 | Ida et al. | |
| 2014/0233051 | A1 | 8/2014 | Hagiwara et al. | |
| 2014/0237075 | A1 | 8/2014 | Ida et al. | |
| 2014/0244754 | A1 | 8/2014 | Mizutani et al. | |
| 2015/0180933 | A1* | 6/2015 | Spracklen et al. | .... G06F 17/246 715/740 |

FOREIGN PATENT DOCUMENTS

JP    2002-063194    2/2002
JP    2013-111981    6/2013

* cited by examiner

*Primary Examiner* — Jerome Grant, II
(74) *Attorney, Agent, or Firm* — Patterson & Sheridan, LLP (57) ABSTRACT

A document distribution server includes a first communication interface that receives printing data corresponding to a document, a processor that generates image data corresponding to the document, based on the received printing data, a memory that stores the received printing data and the generated image data, and a second communication interface that distributes the generated image data in response to a request for a document which corresponds to the generated image data stored in the memory.

17 Claims, 8 Drawing Sheets

DOCUMENT DISTRIBUTION SERVER AND DOCUMENT DISTRIBUTION METHOD

FIELD

Embodiments described herein related to a document distribution server and a document distribution method.

BACKGROUND

A conventional document distribution system includes a browsing terminal that displays document data distributed by a server, and a printer that prints the document data distributed by the server. In the conventional document distribution system, the browsing terminal selects an application program for opening the document data distributed from the server and displays the image of the document data opened through the selected application program on a display device. Further, the printer acquires printing data, such as PDL data and the like, of the document to be printed, and executes printing processing, including raster image processing, based on the acquired printing data.

However, in the conventional document distribution system, there exists a case where a change in layout, character corruption, or the like may occur in the image displayed by the browsing terminal and the printing result image of the printer.

DETAILED DESCRIPTION

A document distribution server according to an embodiment includes as first communication interface that receives printing data corresponding to a document, a processor that generates image data corresponding to the document, based on the received printing data, a memory that stores the received printing data and the generated image data, and a second communication interface that distributes the generated image data in response to a request for a document which corresponds to the generated image data stored in the memory. Embodiments are described below with reference to the accompanying drawings First, the arrangement of a document distribution system according to the present embodiment is described.

Figure 1:
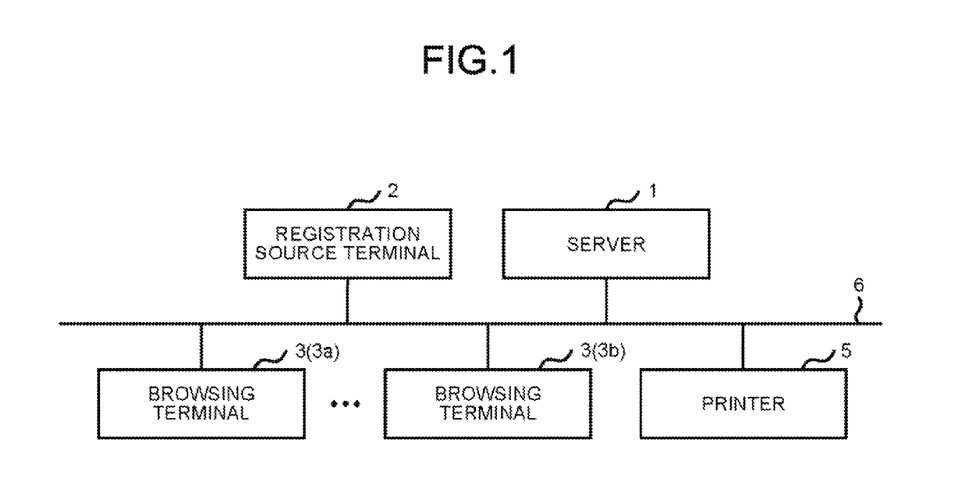
FIG. 1 illustrates an example configuration of a document distribution system according to one embodiment.

FIG. 1 is a diagram illustrating an example configuration of the document distribution system according to the present embodiment.

In the example shown in FIG. 1, the document distribution system comprises a server (document distribution server) 1, a registration source terminal 2, a browsing terminal 3 (3a, 3b, etc.), a printer 5, a network 6 and the like. The server 1, the registration source terminal 2, the browsing terminal 3 and the printer 5 are connected with each other through the network 6.

The server 1 is a computer which manages documents distributed to each machine connected with the network 6. The server 1 also executes programs (stored in a memory) with a processor. The server 1 has an image generation function in which image data is generated from document data that is to be distributed in a print format. For example, the server 1 includes a raster image processor (RIP) for implementing the image generation function. The RIP may be achieved by executing a RIP program through a processor or it may be comprised of dedicated hardware. In addition, in the present embodiment, the document data in a print format refers to the data in PDL (Page Description Language) format (hereinafter referred to as PDL data).

Further, the server 1 manages the PDL data, the generated image data to be distributed, attribute information of the document, and the like, as data relating to the document to be distributed. The server 1 has a document distribution function in which the image data of the document is distributed to the browsing terminal 3 or the printer 5. For example, the server 1 acquires the PDL data from the registration source terminal 2 as the data of the document to be distributed, and generates the image data from the acquired PDL data for distribution using the RIP. The server 1 distributes the generated image data in response to a request from the browsing terminal 3. The server 1 distributes the printing data or the generated image data of the document in response to a request from the printer 5.

The registration source terminal 2 communicates with the server 1 through the network 6. The registration source terminal 2 is a computer which executes programs stored in a memory through a processor. The registration source terminal 2 is a device such as a personal computer, a tablet terminal, a smart phone and the like. The registration source terminal 2 is provided with a printer driver program. The registration source terminal 2 executes the printer driver program (hereinafter referred to as printer driver) with a processor to convert the document data which can be opened with a specific application program (hereinafter referred to as application) into the PDL data in response to an instruction of a user. The registration source terminal 2 sends the PDL data generated from the document data to the server 1.

For example, the registration source terminal 2 opens the document data which is to be distributed to the browsing terminal 3 or the printer 5 with a specific application. If a printing instruction is received in a state in which the document data is opened, the registration source terminal 2 converts the document data into the PDL data through the printer driver. The registration source terminal 2 registers the PDL data in the server 1.

The browsing terminal 3 carries out communication with the server 1 through the network 6. The browsing terminal 3 is a computer which executes programs stored in a memory with a processor. The browsing terminal 3 is a device such as a personal computer, a tablet terminal, a smart phone and the like. The browsing terminal 3 displays the image data distributed from the server 1 on a display device. For example, the browsing terminal 3 requests the server 1 to distribute the image data of a document designated by the user through an input device. The browsing terminal 3 displays the image data distributed from the server 1 in response to the distribution request on the display device.

The printer 5 communicates with the server 1 through the network 6. For example, the printer 5 may be a network printer, or a digital multi-function peripheral (MFP) provided with a scanner, a facsimile and the like. The printer 5 executes programs stored in a memory with a processor. For example, the printer 5 has an image generation function, which is equivalent to the image generation function of the server 1, of generating image data from the PDL data. The printer 5 carries out image forming processing based on the image data distributed from the server 1 or the image data generated from the PDL data distributed from the server 1.

Further, in a case of executing image forming processing, the printer 5 can change the scale, resolution, or the arrangement of images and the like to convert the image data into the image data for printing. For example, the printer 5 may change the resolution or the scale of the image data and the like, according to a finisher for processing the paper on which an image is formed. That is, the printer 5 executes image forming processing based on the image data equivalent to the image data distributed to the browsing terminal 3.

Figure 2:
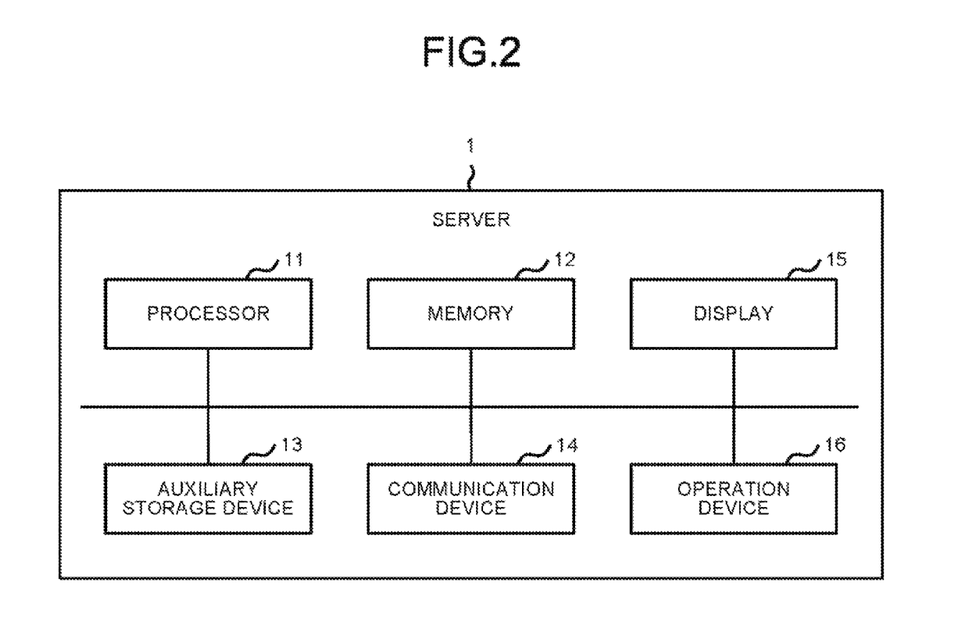
FIG. 2 is a block diagram illustrating an example configuration of a server in the document distribution system.

Next, an example configuration of the server 1 is described.

FIG. 2 is a diagram illustrating an example configuration of the server 1 in the document distribution system, according to the present embodiment.

In the example shown in FIG. 2, the server 1 includes a processor 11, a memory 12, an auxiliary storage device 13, a communication device 14, a display 15, an input device 16 and the like.

The processor 11 is an arithmetic processor such as a CPU and the like. The memory 12 is a working memory consisting of a RAM and the like. The auxiliary storage device 13 is a rewritable nonvolatile memory for storing programs executed by the processor 11. Further, the auxiliary storage device 13 stores the data relating to the document to be distributed. The auxiliary storage device 13 consists of, for example, a HDD (Hard Disk Drive), a SSD (Solid State Drive), and the like. The auxiliary storage device 13 may store log information relating to the registration and the distribution of the document, and the like.

The communication device 14, which is a network interface for connection with the network 6, includes a first interface having a reception function integrated with a second interface having a sending function. The display 15 displays the management data or the image data of the document. The input device 16 receives an input from an operator such as a system manager and the like.

The processor 11 reads the programs stored in the auxiliary storage device 13 and the like, opens the programs in the memory 12 and executes the programs. An image generation controller for generating image data from the printing data is arranged inside the processor 11. For example, the processor 11 executes a program (for example, the RIP program) stored in the auxiliary storage device 13 to generate image data for distribution from the PDL data. In this way, the image data for distribution can be displayed or printed as the equivalent image by any machine regardless of the application.

The server 1 has an image generation function, which is equivalent to the image generation function of the printer 5, for generating image data from the PDL data. For example, the server 1 includes, as the image generation function, the raster image processor (RIP) for generating raster image data from the printing data (PDL data). The RIP program stored in the auxiliary storage device 13 is executed through the processor 11. The RIP that performs the image generation function may consist of dedicated hardware.

Further the image generation function may generate a plurality of categories of image data from one PDL data. For example, the server 1 may generate high resolution image data for browsing and low resolution image data for thumbnail display from one PDL data, using the image generation function.

The processor 11 executes the program for document distribution to carry out document registration and document distribution. For document registration, the processor 11 stores the image data for distribution, the PDL data, and the like, in the auxiliary storage device 13 as the data of the document to be distributed. For document distribution, the processor 11 distributes the image data for browsing or a document list to browsing terminal 3 or the printer 5. The processor 11 distributes either of the image data for browsing and the PDL data to the printer 5.

Figure 3:
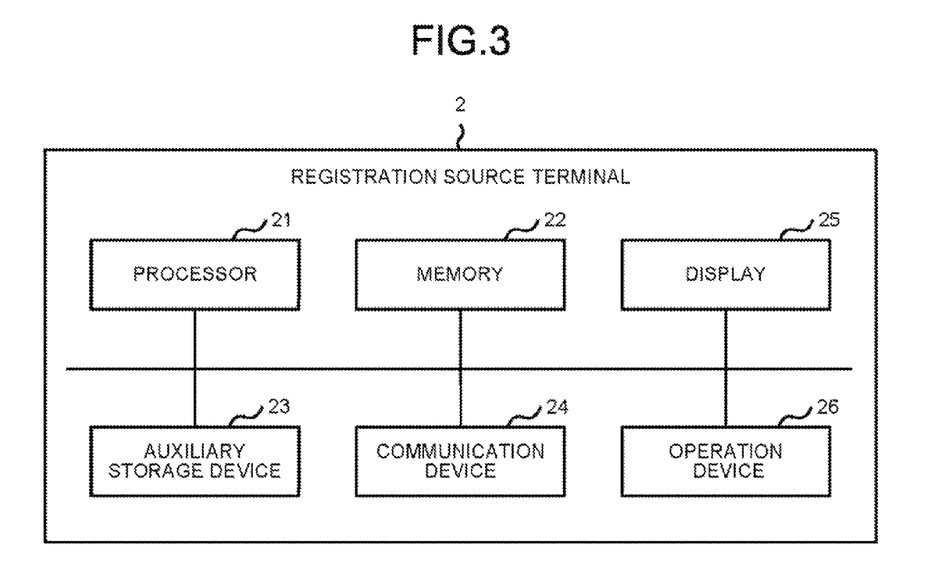
FIG. 3 is a block diagram illustrating an example configuration of a registration source terminal in the document distribution system.

Next, an example configuration of the registration source terminal 2 is described.

FIG. 3 is a diagram illustrating an example configuration of the registration source terminal 2 in the document distribution system according to the present embodiment.

In the example shown in FIG. 3, the registration source terminal 2 includes a processor 21, a memory 22, an auxiliary storage device 23, a communication device 24, display 25, an input device 26 and the like.

The processor 21 is an arithmetic processor such as a CPU and the like. The memory 22 is a working memory consisting of a RAM and the like. The auxiliary storage device 23 is a rewritable nonvolatile memory for storing programs executed by the processor 21. The auxiliary storage device 23 is a rewritable high-capacity nonvolatile memory such as a HDD (Hard Disk Drive), a SSD (Sold State Drive), and the like. For example, the auxiliary storage device 23 stores the document data, an application that opens the document data, a printer driver for instructing the printing of the document, and the like.

The processor 21 executes programs stored in the auxiliary storage device 23 to realize various functions. For example, the processor 21 can execute the application stored in the auxiliary storage device 23 to open the document data. Further, the processor 21 executes the printer driver stored in the auxiliary storage device 23 to convert the opened document data into the PDL data and send the converted PDL data to the server 1.

The communication device 24 is a network interface for connection with the network 6. The display 25 displays, for example, the document data opened through the application, or an input screen of the printer driver for instructing the printing (registration into the server 1) of the document data, and the like. The input device 26 receives an input from an operator. For example, the display 25 and the input device 26 may be a display device provided with a touch panel.

Figure 4:
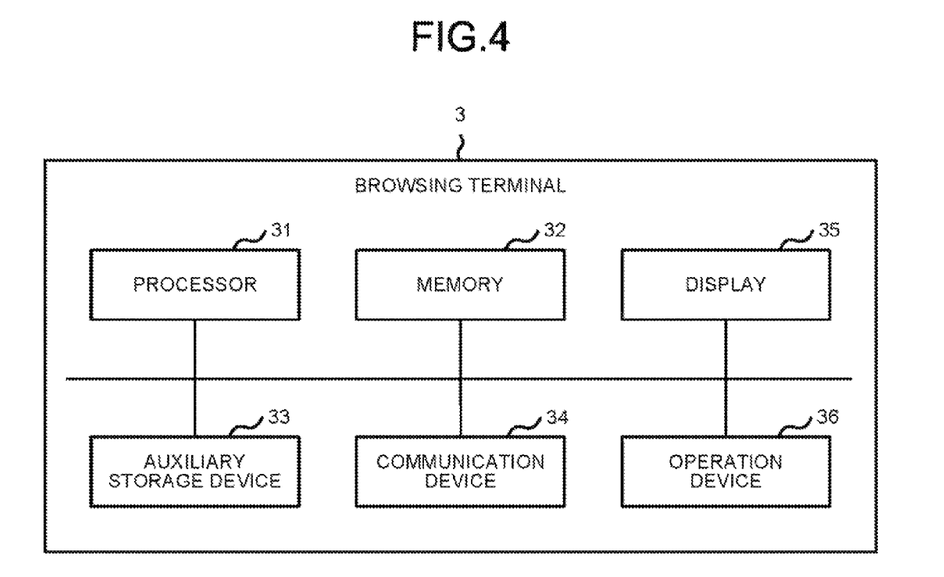
FIG. 4 is a block diagram illustrating an example configuration of a browsing terminal in the document distribution system.

Next, an example configuration of the browsing terminal 3 is described.

FIG. 4 is a diagram illustrating an example configuration of the browsing terminal 3.

In the example shown in FIG. 4, the browsing terminal 3 includes a processor 31, a memory 32, an auxiliary storage device 33, a communication device 34, a display 35, an input device 36 and the like.

The processor 31 is an arithmetic processor such as a CPU and the like. The memory 32 is a working memory consisting of a RAM and the like. The auxiliary storage device 33 is a rewritable nonvolatile memory for storing programs executed by the processor 31. The auxiliary storage device 33 consists of, for example, a HDD (Hard Disk Drive), or a SSD (Solid State Drive) and the like.

The processor 31 executes programs stored in the auxiliary storage device 33 to realize various functions. For example, the processor 31 executes the programs stored in the auxiliary storage device 33 for document browsing to acquire the image data (raster image data) of the document selected by the use from the server 1, and to display the image data acquired from the server 1 on the display 35.

The communication device 34 is a network interface for connection with the network 6. The display 35 displays the image data distributed from the server 1. Further, the display 35 also displays the document list distributed from the server 1, and the like. The input device 36 receives an input from an operator. The input device 36 consists of a key board, a pointing device, a touch panel and the like. For example, the display 35 and the input device 36 may be a display device integrated with a touch panel.

Figure 5:
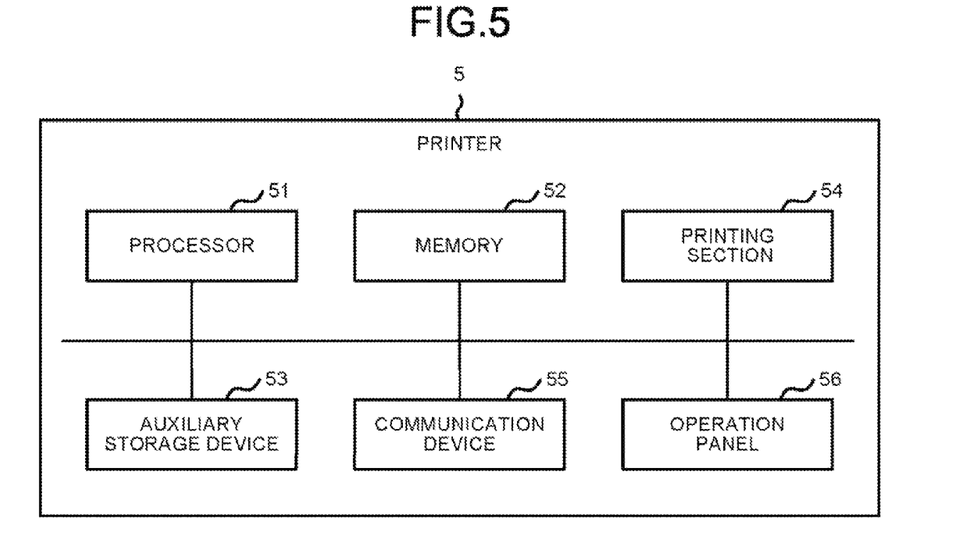
FIG. 5 is a block diagram illustrating an example configuration of a printer in the document distribution system.

Next, an example configuration of the printer 5 is described.

FIG. 5 is a diagram illustrating an example configuration of the printer 5.

In the example shown in FIG. 5, the printer 5 includes a processor 51, a memory 52, an auxiliary storage device 53, a printing section 54, a communication device 55, an input panel 56 and the like.

The processor 51 is an arithmetic processor such as a CPU and the like. The memory 52 is a working memory consisting of a RAM and the like. The auxiliary storage device 53 is a rewritable nonvolatile memory for storing programs executed by the processor 51. The auxiliary storage device 53 consists of, for example, a HDD (Hard Disk Drive), or a SSD (Solid State Drive) and the like.

The processor 51 executes programs stored in the auxiliary storage device 53 to realize various functions. For example, the processor 51 generates image data (for example, raster image data) equivalent to the image data for distribution from the PDL data by executing the program (for example, RIP program) for image generation which is stored in the auxiliary storage device 53 (which is the same program for image generation executed by the server 1. Further, the processor 51 also changes the image arrangement according to finishing processing content, scaling the generated image data, and changing the resolution to the resolution for printing, by executing the program for printing processing.

The printing section 54 executes image forming processing according to an instruction from the processor 51. For example, the printing section 54 carries out image formation based on the image data acquired from the server 1 or the image data generated from the PDL data by the processor 51. The printing section 54 is not limited to a specific image forming type. For example, the printing section 54 may be an electrophotographic type printer, an inkjet-type printer, or a thermal transfer type printer and the like. Further, the printing section 54 may be a color printer or a monochrome printer.

The communication device 55 is a network interface for connection with the network 6. For example, the communication device 55 acquires the image data of the document or the PDL data from the server 1. The input panel 56 displays guidance for the operator or receives an operation instruction from the operator. The input panel 56 includes a display section consisting of a liquid crystal display device and the like, and an input section consisting of, for example, a touch panel or various operation buttons such as a numeric key. For example, the input panel 56 may be a display device provided with a touch panel.

In addition, in the document distribution system according to the present embodiment, the image data (raster image data) is generated for individual image data of each document, i.e., the image of each page of each document. Further, even if the scale, the resolution, or the arrangement on a printing medium and the like are changed, each image data (raster image data) is referred to the equivalent image or the same image as long as there is no change in each image. Thus, in the present embodiment, in the printing processing by the printer 5 or in the image display processing by the browsing terminal 3, even if the scale, the resolution or the arrangement and the like are changed for each image data, the image printed by the printer 5 and the image displayed on the display device such as the browsing terminal 3 are the same.

Next, the processing of each device in the document distribution system according to the present embodiment is described.

Figure 6:
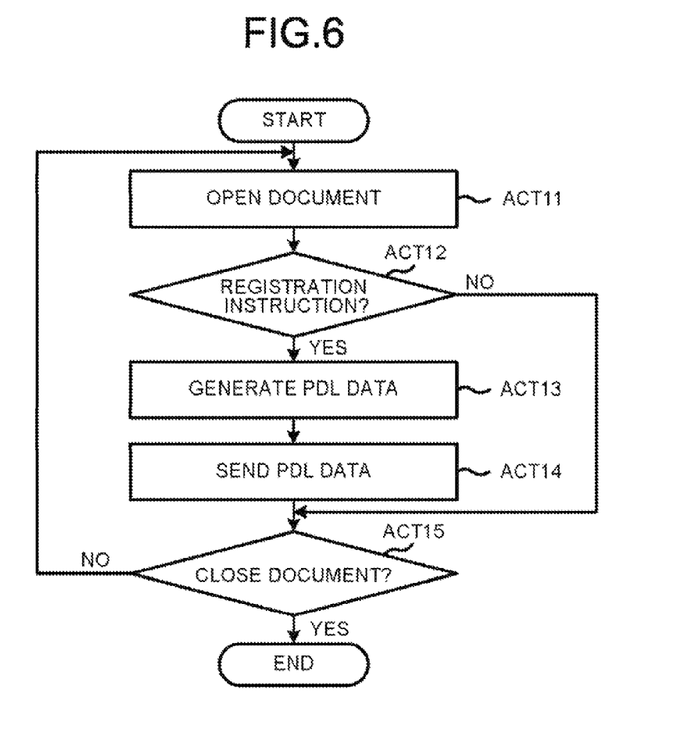
FIG. 6 is a flowchart illustrating an example sequence of operations carried out in the registration source terminal of the document distribution system.

FIG. 6 is a flowchart illustrating an example sequence of operations in the registration source terminal 2 according to the present embodiment.

The registration source terminal 2 registers the document data in the server 1 in response to an operation of the operator. That is, the processor 21 of the registration source terminal 2 designates the document data desired to be registered (and distributed) in response to an instruction from the operator received through the input device 26. If the document to be distributed is designated through the input device 26, the processor 21 selects an application for opening the document data of the designated document. The processor 21 may select the application according to the attribute information of the document data of the designated document and the like, or select the application designated by the operator through the input device 26.

After the application is selected, the processor 21 starts the selected application. After the application is started, the processor 21 opens the document data of the designated document through the application (ACT 11). For example, the processor 21 displays the document data on the display 25, using the application. After the document data is opened, the processor 21 receives an input of the operator requesting to register the opened document in the server 1 (ACT 12). In the present embodiment, the processor 21 registers the opened document server 1 in response to a document printing instruction.

If an operation instruction to print (register) the document is received (YES in ACT 12), the processor 21 starts the printer driver stored in the storage device 23. After the printer driver is started, the processor 21 generates PDL data (data in a print format) from the document data of the document opened through the application (ACT 13). After the PDL data of the document designated by the operator is generated, the processor 21 sends the generated PDL data to the server 1 (ACT 14).

After the PDL data of the document is sent to the server 1, the processor 21 receives an instruction from the operator indicating to close the document (YES in ACT 15). In response to the instruction to close the document, the processor 21 ends the application to end the registration processing.

As stated above, in the registration source terminal 2, the PDL data of the document data is generated through the printer driver in response to the document printing instruction and the generated PDL data is registered in the server 1. In this way, the registration source terminal 2 can send (register) the PDL data generated in response to the printing instruction to the server 1 rather than a printing device such as a printer.

Next, the processing of the server 1 in the document distribution system according to the present embodiment is described.

Figure 7:
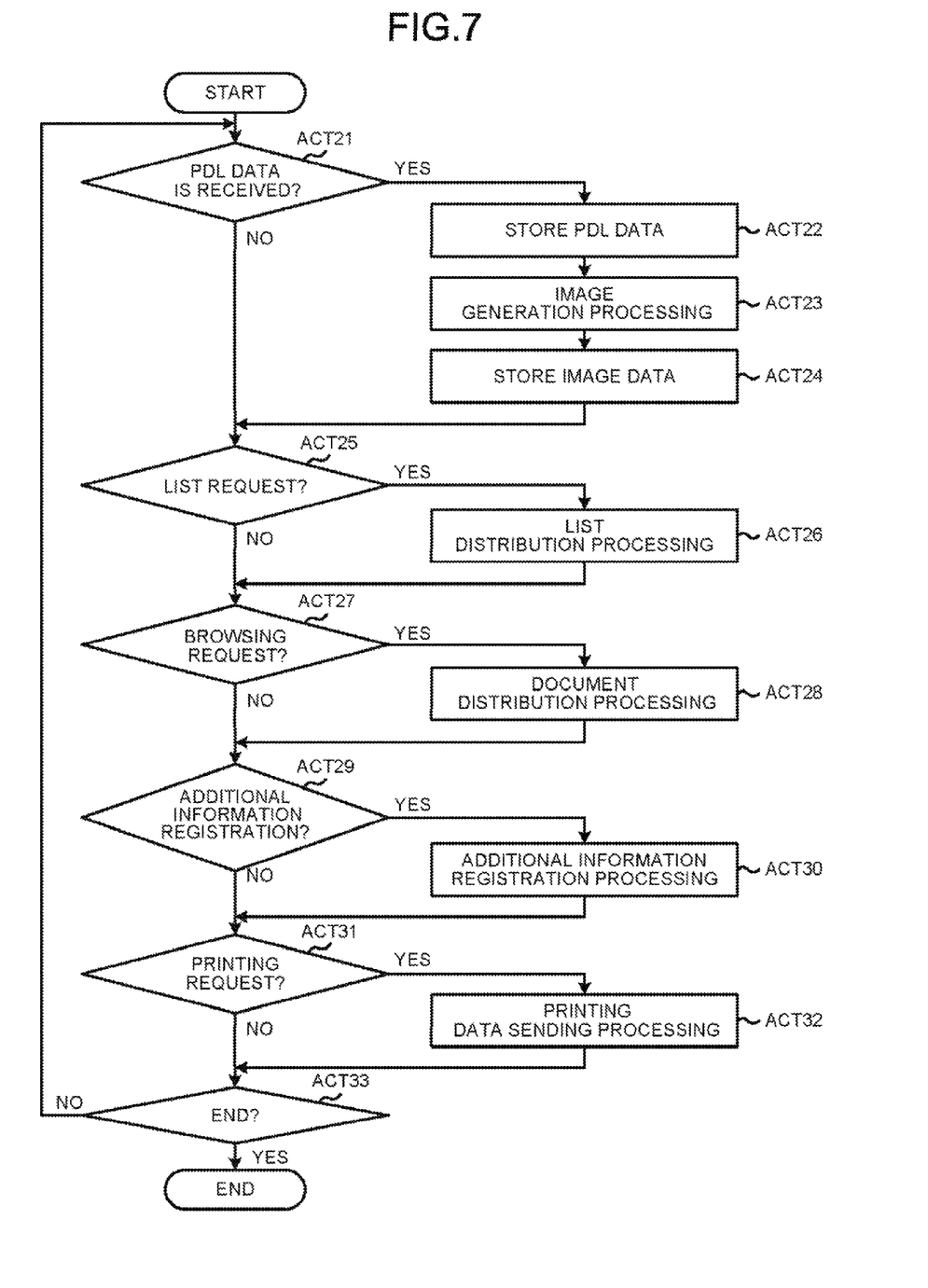
FIG. 7 is a flowchart illustrating an example sequence of operations carried out in the server of the document distribution system.

FIG. 7 is a flowchart illustrating an example sequence of operations carried out in the server 1 according to the present embodiment.

In the present document distribution system, the server 1 includes an input port for receiving the PDL data from each registration source terminal 2, which is connected through the communication device 14 via the network 6. The processor 11 of the server 1 monitors the input port for the PDL data (ACT 21).

If it is detected that the PDL data is input (YES in ACT 21), the processor 11 stores the PDL data serving as the data of the document received from the registration source terminal 2 in the auxiliary storage device 13 (ACT 22). After the received PDL data is stored in the auxiliary storage device 13, the processor 11 generates the image data for distribution from the PDL data through the image generation function (ACT 23).

For example, the processor 11 reads the RIP program stored in the auxiliary storage device 13. The processor 11 executes the expanded RIP program and reads and analyzes the PDL data. The processor 11 analyzes the PDL data, expands characters, draws the lines and expands the embedded photos, and the like, to generate the image data (raster image data).

The processor 11 creates image data (raster image data) for each page of the document in the acquired PDL data of the document. Further, the processor 11 creates different image data having different resolutions for different use. For example, the processor 11 generates high resolution image data for browsing and low resolution image data for thumbnail display. For example, high resolution image data for browsing is sent to the browsing terminal 3 or the printer 5 as the data for browsing or printer. For example, low resolution image data for thumbnail display is sent to the browsing terminal 3 or the printer 5 as part of the information of each document on the document list.

After the image data of the document is generated, the processor 11 stores the generated image data in the auxiliary storage device 13 in association with the PDL data and the information indicating the document (ACT 24). In a case where different image data with different resolutions is created, the processor 11 stores each image data of each resolution in the auxiliary storage device 13 in association with the PDL data. Further, the processor 11 may also store browsing restriction information (information indicating users that are allowed to browse), the information indicating the registrant the document, or the information indicating the registration source terminal, and the like in association with the information indicating the document.

The processing in ACT 22-24 is the document registration processing for registering the data of the document to be distributed. In accordance with such document registration processing, the registrant information, the browsing restriction information, the image data (including the plurality of image data, a plurality of image data with different resolutions, and the like) of the document, the PDL data of the document, the information indicating the document, the PDL data from the registration source terminal 2, and the like are stored in the auxiliary storage device 13 in an associated manner. In addition, the processor 11 may also store the database of management information of each registered document in the auxiliary storage device 13.

Further, the server 1 includes a reception port for various processing requests from each browsing terminal 3 or printer 5, which is connected through the communication device 14 via the network 6. The processor 11 of the server 1 monitors the reception port. In the present embodiment, the server 1 receives a document list request from the browsing terminal 3 or the printer 5, the document browsing request from the browsing terminal 3, the additional information registration request from the browsing terminal 3, the printing request from the printer 5, and the like through the reception port.

If the document list request from the browsing terminal 3 or the printer 5 is received (YES in ACT 25), the processor 11 carries out list distribution processing for distributing the document list in response to the request (ACT 26). The list distribution processing creates a list of browsable documents and sending the created document list to the requestor device the browsing terminal 3 or the printer 5).

Figure 8:
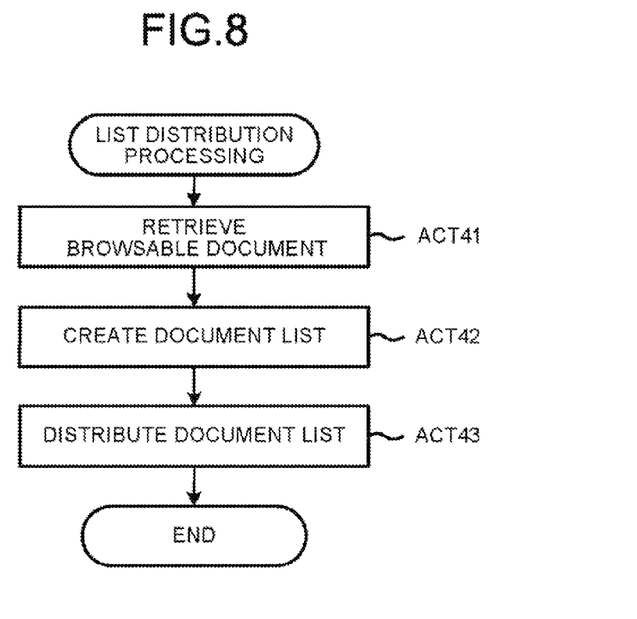
FIG. 8 is a flowchart illustrating an example sequence of operations, for list distribution processing, carried out in the server of the document distribution system.

FIG. 8 is a flowchart illustrating an example sequence of operations for the list distribution processing.

If a list request message for requesting the transfer of the document list is received from the browsing terminal 3 or the printer 5, the processor 11 retrieves the browsable documents from the documents stored in the auxiliary storage device 13 (ACT 41). For example, user information may be contained in the list request message. When the list request message containing the user information is received, the processor 11 analyzes the message to obtain the user information of the user that requested the document list. After the user information is obtained, the processor 11 retrieves the documents that can be browsed by the user, as indicated by the acquired user information, from the auxiliary storage device 13.

Further, in a case where the server 1 includes a database for managing the documents, the processor 11 may retrieve and specify the image data that can be referred to from the database. If the browsable documents are retrieved, the processor 11 creates a list of the documents that can be browsed by the user according to the retrieval result (ACT 42). In a case where the image data for thumbnail display of each document is generated, the processor 11 creates a document list which includes a thumbnail display of each document that can be browsed by the user. After the document list is created, the processor 11 sends the created document list to the device (requesting source of the list) which sent the list request message (ACT 43).

Returning to FIG. 7, if a document browsing request is received from the browsing terminal 3 (YES in ACT 27), the processor 11 carries out a document distribution processing for distributing the image data as the document browsing data in response to the request (ACT 28).

Figure 9:
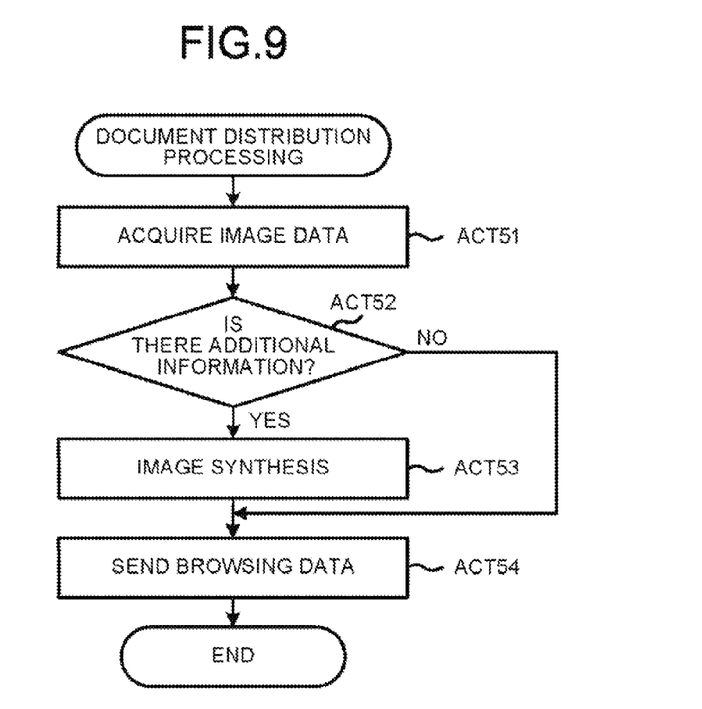
FIG. 9 is a flowchart illustrating an example sequence of operations for document distribution processing, carried out in the server of the document distribution system.

FIG. 9 is a flowchart illustrating an example sequence of operations for the document distribution processing.

The server 1 receives message which contains the user information and the request to browse the document from the browsing terminal 3. When the message containing the request to browse the document is received, the processor 11 analyzes the user information contained in the message and the information indicating which document is requested for browsing. After the user information and the information indication the document to be browsed are analyzed, the processor 11 retrieves the image data that can be referred to by the user to acquire the image data of the document requested for browsing, from the auxiliary storage device 13 (ACT 51).

After the image data is acquired, the processor 11 determines whether or not there is additional information in the image data (ACT 52). If it is determined that there is additional information (YES in ACT 52), the processor 11 synthesizes the image of the additional information with the acquired image data to generate the image data for distribution (ACT 53). After the image data for distribution is obtained, the processor 11 creates browsing data containing the image data for distribution. For example, in a case where there is a plurality of image data in the document requested for browsing, the processor 11 summarizes the plurality of image data to create browsing data. After the browsing data is created, the processor 11 distributes the browsing data to the browsing terminal 3 serving as the browsing requesting source (ACT 54).

Returning to FIG. 7, if a request for registration of additional information for the image of the document is received from the browsing terminal 3 (YES in ACT 29), the processor 11 carries out an additional information registration processing in response (ACT 30). For example, when a message including the additional information registration request is received, the processor 11 analyzes the user information, the information indicating the added image, and the additional information from the message. After the user information, added image and the additional information are analyzed, the processor 11 stores the acquired additional information in the auxiliary storage device 13 in association with the user information and the information indicating the added image.

Further, if a printing request for requesting to print the document is received from the printer 5 (YES in ACT 31), the processor 11 carries out a printing data sending processing by sending the data of the document to the printer 5 (ACT 32).

Figure 10:
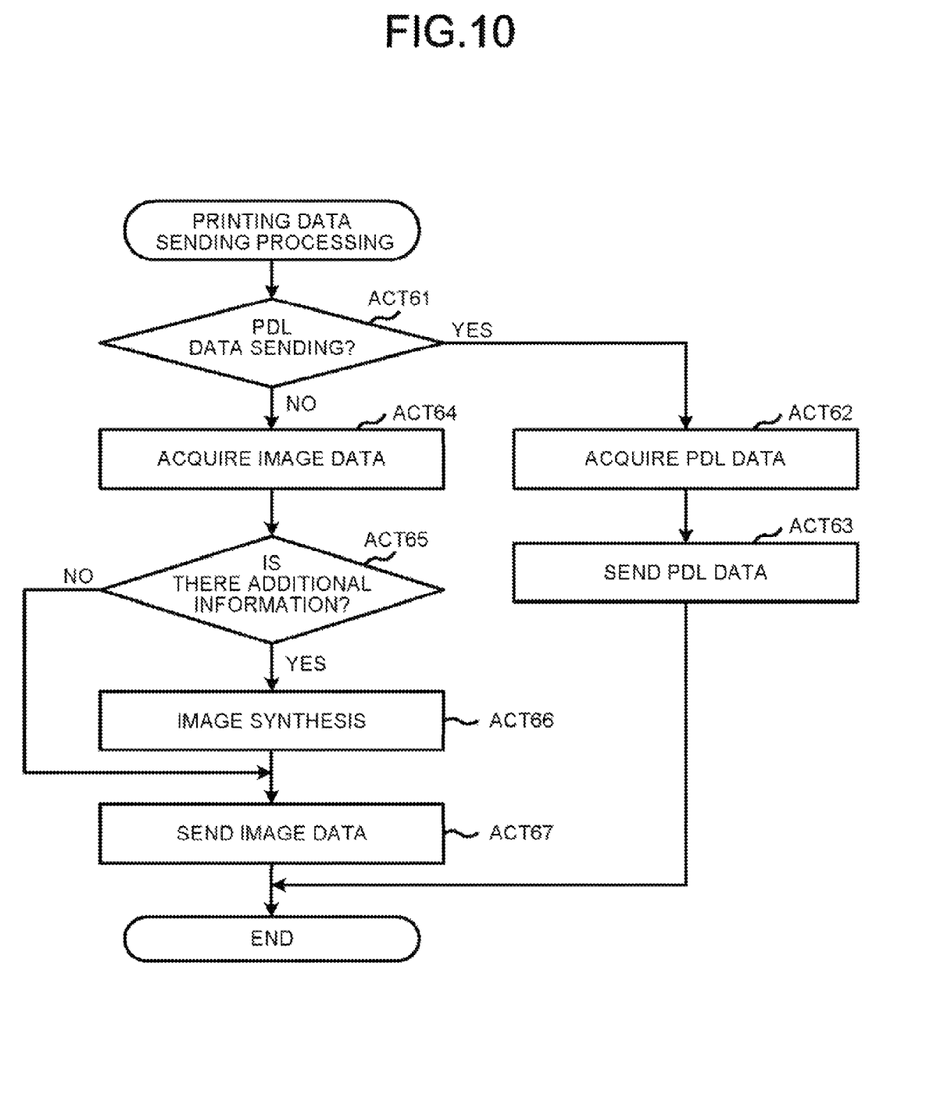
FIG. 10 is a flowchart illustrating an example sequence of operations for sending print data, carried out in the server of the document distribution system.

FIG. 10 is a flowchart illustrating an example of the printing data sending processing.

The server 1 receives the printing request message to print the document from the printer 5. The message recreating printing contains user information, information indicating the document to be printed, and information indicating whether the requested data is PDL data or image data (raster image data). When the printing request message is received, the processor 11 determines whether the requested data is PDL data or image data, according to the received message (ACT 61).

If it is determined that the printing data requested from the printer 5 is PDL data (YES in ACT 61), the processor 11 acquires the PDL data of the document to be printed from the auxiliary storage device 13 according to the information contained in the received printing request message (ACT 62). After the PDL data of the document to be printed is acquired, the processor 11 sends the acquired PDL data to the printer 5 (ACT 63).

Further, if it is determined that the data requested from the printer 5 is image data (NO in ACT 61), the processor 11 acquires the image data of the document to be printed from the auxiliary storage device 13 according to the information contained in the received printing request message (ACT 64).

After the image data of the document to be printed is acquired, the processor 11 determines whether there is additional information in the image data (ACT 65). If it is determined that there is additional information (YES in ACT 65), the processor 11 synthesizes the additional information with the acquired image data (ACT 66).

If there is no additional information (NO in ACT 65), or after the additional information is synthesized with the image data, the processor 11 creates printing image data containing the image data of the document. For example, in a case where there is a plurality of image data in the document requested for printing, the processor 11 summarizes the plurality of image data to create printing image data. After the printing image data is created, the processor 11 sends the printing image data the printer 5 serving as the printing requesting source (ACT 67).

Returning to FIG. 7, if an instruction to end the server processing is received (YES in ACT 33), the processor 11 of the server 1 ends the program being executed by the server. If there is no instruction indicating to end the server processing (NO in ACT 33), the processor 11 repeats the processing described above.

Figure 11:
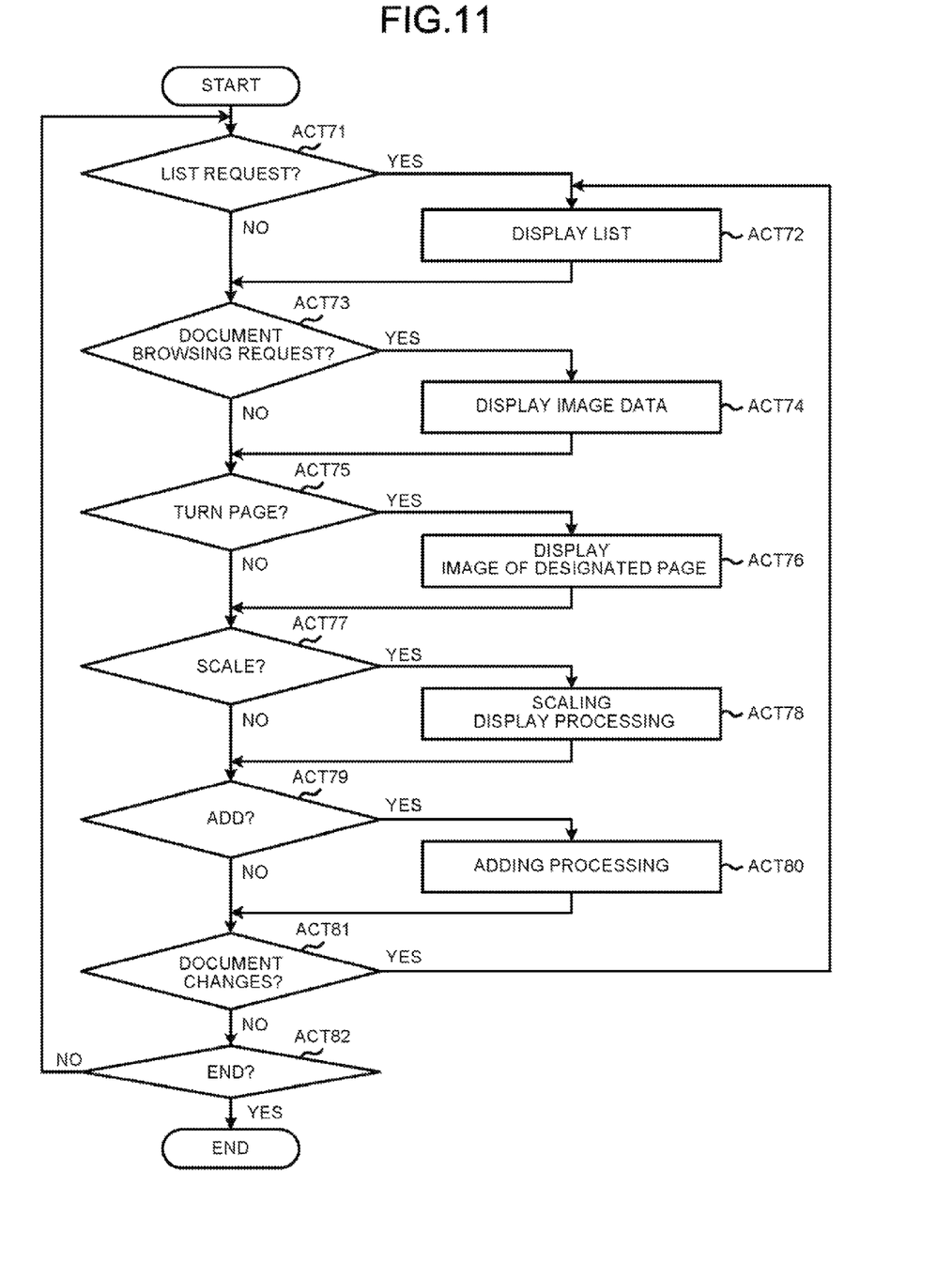
FIG. 11 is a flowchart illustrating an example sequence of operations carried out in the browsing terminal of the document distribution system.

Next, an example sequence of operations carried out in the browsing terminal 3 of the document distribution system is described.

FIG. 11 a flowchart illustrating an example of the processing carried out in the browsing terminal 3 according to the present embodiment.

First, the processor 31 of the browsing terminal 3 starts the application for the document distribution system based on a user instruction. For example, the processor 31 starts the application for the document distribution system if the user logs in. After the application for the system is started, the processor 31 of the browsing terminal 3 monitors for user input through the input device 36.

If an instruction for requesting the document list is input through the input device 36 (YES in ACT 71), the processor 31 carries out a list display processing (ACT 72). The list display processing includes acquiring the document list from the server 1 and displaying the acquired document list on the display 35.

In the list display processing, the processor 31 sends a list request message to the server 1 together with user information indicating the user. After the list request message is sent, the processor 31 waits for the distribution of the document list from the server 1. For example, if the document list cannot be received in a pre-determined time, the processor 31 carries out an error processing. If the document list is received, the processor 31 stores the document list in the auxiliary storage device 33. After the document list is stored, the processor 31 displays the document list on the display 35.

The processor 31 displays, for example, the document list with the image data for thumbnail display of each document. Further, the processor 31 displays the document list in such a manner that each document displayed as the document list on the display 35 can be selected through the input device 36. For example, it may be set that if, for example, the image for thumbnail display of a particular document in the document list is touched by the user, the document can be selected by touching the touch panel which serves as the input device 36.

Further, if the selection of the document to be browsed is input through the input device 36 (YES in ACT 73), the processor 31 carries out a document display processing to display the image data of the selected document (ACT 74). The document display processing includes acquiring the image data of the document from the server 1 and displaying the acquired image data on the display 35.

In the document display processing, the processor 31 sends the browsing request message to the server 1, with the document information indicating the selected document and the user information. After the browsing request message is sent, the processor 31 waits for the distribution of the image data of the document to be browsed from the server 1. For example, if the image data of the document to be browsed cannot be received in a pre-determined time, the processor 31 carries out an error processing. If the image data of the document to be browsed is received, the processor 31 stores the image data in the auxiliary storage device 33. After the image data is stored, the processor 31 displays the image data of the document on the display 35. Herein, in a case where there is a plurality of pages of image data, the processor 31 displays the image data of the first part (i.e., image data of the first page) of the document on the display 35.

When the image data of the document is being displayed, the processor 31 receives an input operation on the displayed document through the input device 36 such as a touch panel.

If a page operation on the displayed image is input through the input device 36 (YES in ACT 75), the processor 31 changes the image data to be displayed in response to the input content (ACT 76). For example, if it is instructed to display the image of the next page, the processor 31 specifies the next page based on the page of the displayed image data. After the next page is specified, the processor 31 reads the image data of the corresponding page from the image data of the displayed document stored in the auxiliary storage device 33 and displays it on the display 35. Further, if it is instructed to display a specific page, the processor 31 reads the image of the designated page from the storage device 33 and displays it on the display 35.

If the enlargement or reduction (scaling) of the displayed image is instructed through the input device 56 (YES in 77), the processor 31 carries out enlargement or reduction display processing on the image data being displayed (ACT 78).

If the additional information for the displayed image is input through the input device 36 (YES in ACT 79), the processor 31 carries out processing for registering the added information (additional information) in the server 1 for the image data being displayed (ACT 80). For example, in a case where the user writes a character, draws a line, or the like on the displayed image, the processor 31 creates the information added by the user as additional information for the image. After the additional information is created, the processor 31 creates an adding request message to register the additional information, the user information indicating the user who added the information, and the image data information indicating the added image data. After the adding request message is created, the processor 31 sends the created adding request message to the server 1.

If change of the document to be displayed is input through the input device 36 (YES in ACT 81), the processor 31 receives the change of the document, and proceeds to ACT 72 to display the document list stored in the auxiliary storage device 33 on the display 35.

If it is instructed to end the application for the document distribution system through the input device 36 (YES in ACT 82), the processor 31 ands the application.

Figure 12:
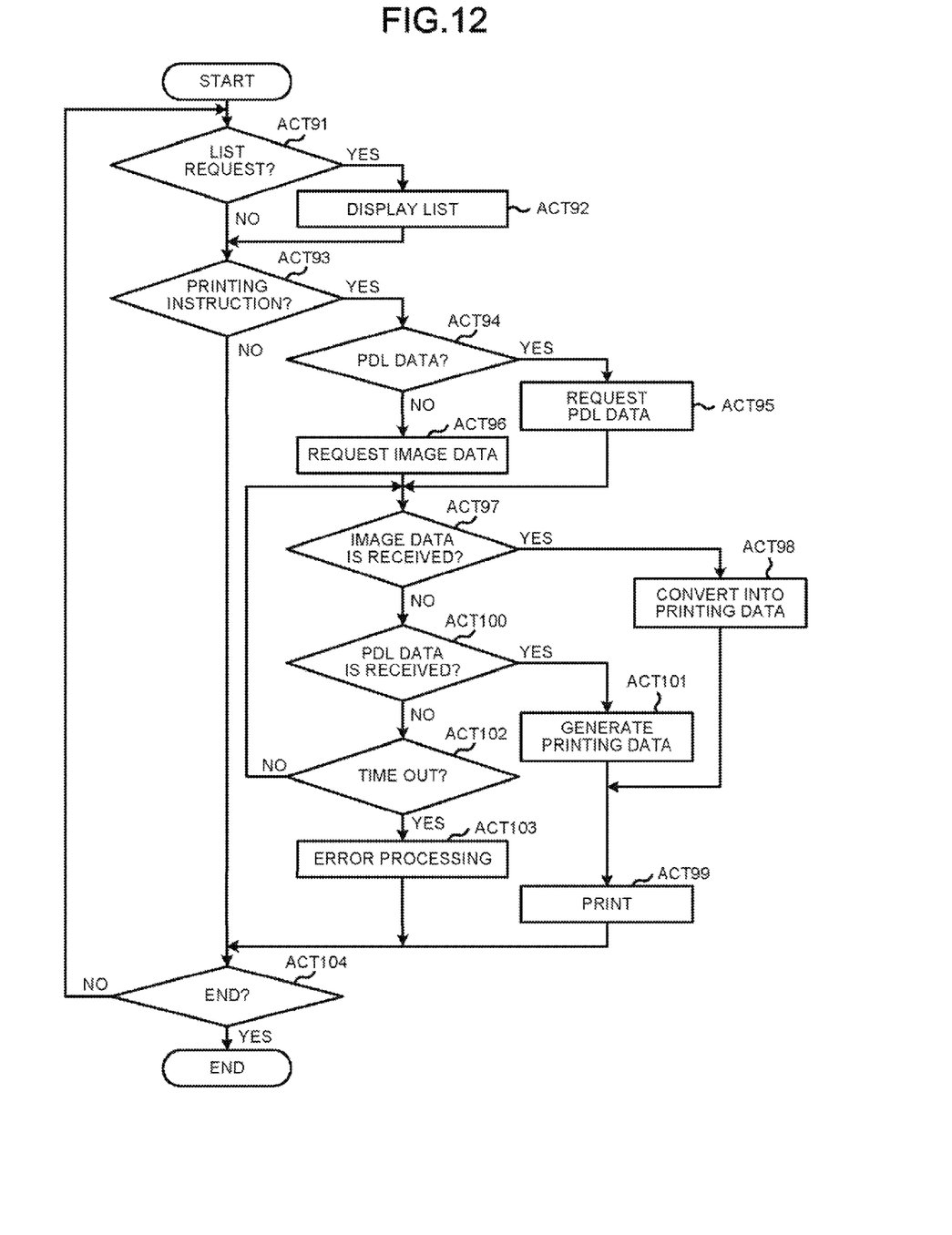
FIG. 12 is a flowchart illustrating an example sequence of operations carried out in the printer of the document distribution system.

Next, the processing carried out in the printer 5 of the document distribution system according to the present embodiment is described.

FIG. 12 is a flowchart illustrating an example sequence of operations carried out in the printer 5.

If an instruction for requesting the document list is input through the input panel 56 (YES in ACT 91), the processor 51 carries out a list display processing for displaying the document list acquired from the server 1 (ACT 92). The list display processing includes acquiring the document list from the server 1 and displaying the acquired document list on the display 35.

For example, the processor 51 sends a list request message for requesting the document list to the server 1 together with the user information. After the list request message is sent, the processor 51 waits for the distribution of the document list from the server 1. If the document list cannot be received in a pre-determined time, the processor 51 carries out an error processing. If the document list is received, the processor 51 stores the document list in the auxiliary storage device 53. After the document list is stored, the processor 51 displays the document list on the display 55. For example, the processor 51 displays the document list, which contains the image data for thumbnail display of each document. Further, the processor 51 displays the document list in such a manner that each document displayed in the document list can be selected through the input panel 56.

Further, if the document to be printed is selected through the input panel 56 (YES in ACT 93), the processor 51 selects whether to acquire the PDL data or the image data (raster data) as the data for printing of the selected document (ACT 94). For example, the processor 51 selects the image data if the document selected to be printed contains additional information, or selects the PDL data if the document selected to be printed contains no additional information.

In addition, the processor 51 may also select whether to acquire the PDL data or the image data as the data for printing according to the selection of the user. Further, the processor 51 may also enable the server 1 to select whether to acquire the PDL data or the image data as the data for printing of the selected document. In this case, the server 1 may select the image data if the selected document contains additional information and select the PDL data if the selected document contains no additional information.

If the PDL data is selected as the data for printing of the selected document, the processor 51 sends a request to the server 1 for the PDL data of the selected document (ACT 95). For example, the processor 51 creates a printing request message for requesting the transfer of the PDL data of the document containing user information and the document information, and sends the created printing request message to the server 1.

Further, if the image data is selected as the data for printing of the selected document, the processor 51 sends a request to the server 1 for the image data of the selected document (ACT 96). In this case, the processor 51 creates a printing request message for requesting the transfer of the image data of the document containing the user information and the document information, and sends the created printing request message to the server 1.

After the printing request message is sent, the processor 51 waits until the PDL data or the image data of the printing document is received. If the PDL data or the image data of the printing document cannot be received in a pre-determined time, the processor 51 carries out an error processing.

If the image data of the printing document is received (YES in ACT 97), the processor 51 converts the image data of the printing document received from the server 1 into data for actual printing (ACT 98). That is, the processor 51 stores the image data of the printing document received from the server 1 in the auxiliary storage device 53. After the image data of the printing document is stored in the auxiliary storage device 53, the processor 51 converts the image data of the printing document received from the server 1 into image data for printing in the printing section 54. For example, the processor 51 converts the image data of the document acquired from the server 1 into a resolution suitable for printing, scales the image according to the finishing processing and the like, or changes the arrangement position of the image.

When the image data for printing is created, the processor 51 stores the created image data in the auxiliary storage device. After the created image data is stored in the auxiliary storage device, the processor 51 supplies the created and stored image data to the printing section 54, and instructs the printing section 54 to execute printing processing (ACT 99). In this way, the printing section 54 executes printing processing based on the supplied image data.

Further, if the PDL data of the printing document is received (YES in ACT 100), the processor 51 generates image data for the actual printing from the PDL data of the printing document received from the server 1 (ACT 101). That is, the processor 51 stores the PDL data of the printing document received from the server 1 in the auxiliary storage device 53. After the PDL data of the printing document is stored in the auxiliary storage device 53, the processor 51 creates image data for printing in the printing section 54 from the PDL data through an image generation program (which is the same as the image generation function of the server 1). For example, the processor 51 analyzes the PDL data through the RIP program, expands characters, draws the lines and expands the embedded photos and the like to generate the image data for printing.

After the image data for printing is generated, the processor 51 stores the generated image data for printing in the auxiliary storage device. After the image data for printing is stored in the auxiliary storage device, the processor 51 supplies the image data for printing to the printing section 54, and instructs the printing section 54 to execute printing processing (ACT 99). In this way, the printing section 54 executes printing processing based on the supplied image data.

Further, if the image data or the PDL data of the printing document cannot be received in a pre-determined time (YES in ACT 102), the processor 51 stops the printing of the document and carries out an error processing (ACT 103).

The processing described above can be repeated until the power source of the printer 5 is turned off. Further, if an operation indicating to turn off the power source is input (YES in ACT 104), the processor 51 turns off the power source of the printer 5.

As stated above, in accordance with the present embodiment, the server has an image generation function equivalent to the printer. The server acquires the data of the document to be distributed as printing data, and generates image data from the acquired printing data of the document through the image generation function. The server distributes the generated image data the document in response to a browsing or printing request from each output device such as the printer or the browsing terminal and the like.

As a result, since the document to be distributed by the server is image data, a change in layout, character corruption, or the like will not occur during display or printing, and the document can be output, as the same image in each output device such as the printer and the browsing terminal. That is, in the document distribution system, each output device—such as the browsing terminal and the printer—can output an equivalent image without any change in layout, character corruption, or the like in the image of the document to be displayed or printed, even if the installed applications are different.

Further, the server is provided with a raster image processor (RIP) for generating raster image data as the image generation function. The server generates raster image data from the input printing data (PDL data) through the raster image processor, and distributes the generated raster image data in response to a request of a client. The raster image processor can function at least as an equivalent to the printer with respect to generating raster image data from the PDL data. Further, the raster image processor may include a function realized by executing the RIP program stored in the auxiliary storage device with the processor. Alternatively, the raster image processor may consist of dedicated hardware.

Moreover, the server generates a high resolution image for browsing display and a low resolution image for thumbnail display through the image generation function. The server distributes the high resolution image for browsing display in response to the document browsing request and distributes the document list containing the low resolution image for thumbnail display in response to the document list request. In this way, the server can supply the image data corresponding to the current use for each output device as the document image.

In the present embodiment, the implemented function may be pre-recorded in the apparatus. However, the present invention is not limited to this. For example, the same function may be downloaded to the apparatus from a network. Alternatively, same function recording in a recording medium may be also installed in the apparatus. The form of the recording medium is not limited as long as the recording medium can store programs (like a CD-ROM and the like) and is readable by an apparatus. Further, the function realized by an installed or downloaded program can also be realized through cooperation with an OS (Operating System) installed in the apparatus.

Further, the digital multi-function peripheral (MFP) serving as one of the devices in the system, or a high-performance browsing terminal, and the like may be used as the device for providing the same function instead of the server.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A document distribution server, comprising:
    a first communication interface configured to receive a plurality of printing data items, each corresponding to a document;
    a processor configured to generate, based on one or more printing data items of the plurality of printing data items corresponding to each document, thumbnail image data and browsing image data;
    a memory configured to store the received printing data items, the generated thumbnail image data and the generated browsing image data; and
    a second communication interface configured to:
        distribute the generated thumbnail image data corresponding to a plurality of documents in response to a request for a document list, and
        distribute the generated browsing image data corresponding to a selected document in response to a request for browsing the selected document.

2. The document distribution server according to claim 1, wherein
    the processor is further configured to generate raster image data based on the received printing data item corresponding to each document.

3. The document distribution server according to claim 2, wherein
    the second communication interface is further configured to distribute the raster image data corresponding to a selected document in response to a request for printing the selected document.

4. The document distribution server according to claim 2, wherein the memory is configured to store the generated raster image data.

5. The document distribution server according to claim 1, wherein
the thumbnail image data has a resolution lower than a resolution of the browsing image data.

6. The document distribution server according to claim 1, wherein the first and second communication interfaces are included in a single network interface.

7. A document distribution method, comprising the steps of:
receiving, with a communication interface in a server, a plurality of printing data items, each corresponding to a document;
generating, with a processor in the server and based on one or more printing data items of the plurality of printing data items corresponding to each document, thumbnail image data and browsing image data;
storing the received printing data items, the generated thumbnail image data and the generated browsing image data;
distributing, through the communication interface, the generated thumbnail image data corresponding to a plurality of documents in response to a request for a document list, and
distributing, through the communication interface, the generated browsing image data corresponding to a selected document in response to a request for browsing the selected document.

8. The document distribution method according to claim 7, wherein the generating step further includes:
generating raster image data based on the received printing data item corresponding to each document.

9. The document distribution method according to claim 8, further comprising the step of:
distributing, through the communication interface, the raster image data corresponding to a selected document in response to a request for printing the selected document.

10. The document distribution method according to claim 8, wherein the storing step includes storing the generated raster image data.

11. The document distribution method according to claim 7, wherein the thumbnail image data has a resolution lower than a resolution of the browsing image data.

12. The document distribution method according to claim 7, wherein the communication interface is a network interface.

13. A non-transitory computer readable medium containing instructions that cause a server to perform a document distribution method comprising the steps of:
receiving, with a communication interface in a server, a plurality of printing data items, each corresponding to a document;
generating, with a processor in the server and based on one or more printing data items of the plurality of printing data items corresponding to each document, thumbnail image data and browsing image data;
storing the received printing data items, the generated thumbnail image data and the generated browsing image data;
distributing, through the communication interface, the generated thumbnail image data corresponding to a plurality of documents in response to a request for a document list, and
distributing, through the communication interface, the generated browsing image data corresponding to a selected document in response to a request for browsing the selected document.

14. The computer readable medium according to claim 13, wherein the generating step further includes:
generating raster image data based on the received printing data item corresponding to each document.

15. The computer readable medium according to claim 14, wherein the document distribution method further comprises the step of:
distributing, through the communication interface, the raster image data corresponding to a selected document in response to a request for printing the selected document.

16. The computer readable medium according to claim 13, wherein the thumbnail image data has a resolution lower than a resolution of the browsing image data.

17. The computer readable medium according to claim 16, wherein the storing step includes storing generated raster image data.

* * * * *